US005757418A

United States Patent [19]

Inagaki

[11] Patent Number: 5,757,418
[45] Date of Patent: May 26, 1998

[54] TELEVISION CONFERENCE SYSTEM AND METHOD THEREFOR

[75] Inventor: Atsushi Inagaki, Yokohama, Japan

[73] Assignee: Canon Kabushiki Kaisha, Tokyo, Japan

[21] Appl. No.: 503,421

[22] Filed: Jul. 17, 1995

Related U.S. Application Data

[63] Continuation of Ser. No. 97,232, Jul. 27, 1993, abandoned.

[30] Foreign Application Priority Data

Jul. 31, 1992 [JP] Japan ........................ 4-205418
Jan. 7, 1993 [JP] Japan ........................ 5-001232

[51] Int. Cl.⁶ .................... H04N 7/14; G09G 5/26; H04M 3/42
[52] U.S. Cl. .................... 348/15; 345/129; 345/146; 348/18; 379/202; 395/348
[58] Field of Search .................... 348/12, 13, 14, 348/15, 18, 19, 207, 211, 219; 379/202; 345/119, 123, 129, 146; 395/348, 351

[56] References Cited

U.S. PATENT DOCUMENTS

| | | | |
|---|---|---|---|
| 4,516,156 | 5/1985 | Fabris et al. | 348/15 |
| 4,581,647 | 4/1986 | Vye | 358/210 |
| 4,935,953 | 6/1990 | Appel et al. | 379/53 |
| 4,953,159 | 8/1990 | Hayden et al. | 348/15 |
| 4,962,521 | 10/1990 | Komatsu et al. | 379/53 |
| 4,996,592 | 2/1991 | Yoshida | 358/85 |
| 5,113,517 | 5/1992 | Beard et al. | 369/200 |
| 5,195,086 | 3/1993 | Baumgartner et al. | 370/62 |
| 5,206,721 | 4/1993 | Ashida et al. | 348/15 |
| 5,218,627 | 6/1993 | Corey et al. | 379/53 |
| 5,382,972 | 1/1995 | Kannes | 348/15 |
| 5,426,732 | 6/1995 | Boies et al. | 395/161 |
| 5,475,421 | 12/1995 | Palmer et al. | 348/18 |

*Primary Examiner*—Bipin Shalwala
*Attorney, Agent, or Firm*—Fitzpatrick, Cella, Harper & Scinto

[57] ABSTRACT

An apparatus for displaying an image captured by a video camera displays a window of the captured image, buttons displayed about the window for scrolling the image, and a sizing button displayed adjacent the window for enlarging/reducing the size of the window. If an operator wishes to pan, tilt or zoom the video camera, the operator manipulates the scroll buttons and sizing button for scrolling the image horizontally or vertically and sizing the window. The apparatus causes the camera to tilt or pan in accordance with the scrolling of the window by the scrolling operation and causes the camera to zoom in or out in accordance with the sizing operation. The apparatus is adapted to display an icon which is a miniature image of the image captured by the video camera. When this icon is selected, the application using the video camera is started. The icon is not displayed if the video camera is operating abnormally.

11 Claims, 14 Drawing Sheets

TELEVISION CONFERENCE SYSTEM AND METHOD THEREFOR

This application is a continuation of application Ser. No. 08/097,232 filed Jul. 27, 1993, now abandoned.

BACKGROUND OF THE INVENTION

1. Field of the Invention:

This invention relates to an image processing apparatus and method for processing an image entered using a video camera or the like.

2. Description of the Related Art:

In a video processing system using a video camera, such as a television conference system, one's own image (local image) and the image of another party (remote image) are displayed respectively in a window 81 for display of the local image and a window 82 for display of the remote image, as illustrated in FIG. 8. By operating a camera control window 83 using a pointing device such as a mouse, the operator performs control (panning, tilting and zooming) of the local and remote cameras. Alternatively, the operator may control these cameras using a separately provided keyboard or special-purpose keys.

Further, information processing systems such as personal computers and work stations are known having a plurality of applications that use a photographic device such as a small television camera. An example of such an application is a TV telephone. The programs for these applications are displayed in the form of icons stored in advance as dot images or the like. The operator starts the desired application by clicking the corresponding icon using a mouse or the like.

In the conventional television conference system mentioned above, the windows for displaying the local and remote images cannot be adjusted freely to a size desired by the operator. If it were attempted to change the sizes of these windows so as to conform to the preferences of the operator, the camera control window would overlap the window for the local image or the window for the remote image, thus making control difficult to perform.

Furthermore, in a case where camera control is performed by providing a keyboard or special-purpose controller, an inconvenience encountered is that control must be performed while observing both the controller and a monitor.

In an arrangement in which the operator starts an application by using a mouse or the like to click a displayed icon that has been stored beforehand in correspondence with the application, it is necessary to set an easily understandable icon for each and every application.

Further, when the application for a TV telephone using a photographic device such as a small television camera is started in the example of the related art described above, the program will start even if the photographic device is incapable of operating because its power supply has not been turned on or for some other reason. However, no image will be displayed. Accordingly, it is necessary to make sure that the photographic device is placed in an operable state such as by turning on its power supply before running the application.

SUMMARY OF THE INVENTION

Accordingly, a first object of the present invention is to provide an image processing apparatus and method in which such operations as the scrolling and enlargement of the image of a window can be performed with ease and an operating application can be ascertained with facility.

A second object of the present invention is to provide an image processing apparatus and method whereby an operator is capable of readily ascertaining the operating status of photographic means.

In order to attain the foregoing objects, the present invention provides an image processing apparatus having a plurality of photographic means for photographing subjects, in which output images from the plurality of photographic means are displayed as a plurality of windows corresponding thereto, the apparatus comprising first display means for displaying, at positions adjacent each window, images for designating scrolling of the window up or down and left and right, second display means for displaying, at a positions adjacent each window, an image for designating enlargement/reduction of the window, designating means for designating scrolling and enlargement/reduction with regard to the displays presented by the first and second display means, and control means for performing control, which is based upon the designation made by the designating means, so as to move the photographic means corresponding to the designated window.

Further, there is provided an image processing apparatus in which there are executed a plurality of applications which include a first application for displaying an output image, which is obtained from photographic means that photographs a subject, on a monitor screen, the apparatus comprising means for displaying the output image on the monitor screen as an icon corresponding to the first application, designating means for designating the icon, and means for starting the first application based upon the designation made by the designating means.

Further, there is provided an image processing apparatus in which there are executed a plurality of applications which include a first application for displaying an output image, which is obtained from photographic means that photographs a subject, on a monitor screen, the apparatus comprising discriminating means for discriminating the status of the photographic means, and means for displaying an icon corresponding to the first application on the monitor screen based upon results of discrimination performed by the discriminating means.

Further, there is provided an image processing apparatus in which there are executed a plurality of applications which include a first application for displaying an output image, which is obtained from photographic means that photographs a subject, on a monitor screen, the apparatus comprising means for displaying a first icon, which corresponds to the first application, on the monitor screen, designating means for designating the first icon, discriminating means for discriminating the status of the photographic means in a case where the icon has been designated by the designating means, and means which, when the photographic means has been discriminated by the discriminating means as being abnormal, is for displaying a second icon, which differs from the first icon, instead of the first icon.

Further, the present invention is provides an image processing method having a plurality of cameras for photographing subjects, in which output images from the plurality of cameras are displayed as a plurality of windows corresponding thereto, the method comprising a first display step of displaying, at positions adjacent each window, images for designating scrolling of the window up or down and left and right, a second display step of displaying, at positions adjacent each window, an image for designating enlargement/reduction of the window, a designating step of designating scrolling and enlargement/reduction with regard to the displays presented by the first and second display steps, and a control step of performing control, which is based upon the designation made by the designating step, so as to move the camera corresponding to the designated window.

Further, there is provided an image processing method in which there are executed a plurality of applications which include a first application for displaying an output image, which is obtained from a camera that photographs a subject, on a monitor screen, the method comprising a step of displaying the output image on the monitor screen as an icon corresponding to the first application, a designating step of designating the icon, and a step of starting the first application based upon the designation made by the designating step.

Further, there is provided an image processing method in which there are executed a plurality of applications which include a first application for displaying an output image, which is obtained from a camera that photographs a subject, on a monitor screen, the method comprising a discriminating step of discriminating the status of the camera, and a step of displaying an icon corresponding to the first application on the monitor screen based upon results of discrimination performed by the discriminating step.

Further, there is provided an image processing method in which there are executed a plurality of applications which include a first application for displaying an output image, which is obtained from a camera that photographs a subject, on a monitor screen, the method comprising a step of displaying a first icon, which corresponds to the first application, on the monitor screen, a designating step of designating the first icon, a discriminating step of discriminating the status of the camera in a case where the icon has been designated by the designating step, and a step of displaying a second icon, which differs from the first icon, instead of the first icon when the camera is discriminated by the discriminating step as being abnormal.

According to the image processing apparatus and method of the invention constructed as described above, displays for scrolling and enlarging/reducing a window are provided adjacent the window. As a result, the operation for scrolling and enlarging/reducing the window is linked with motion of the window, thereby facilitating operation. In addition, it is possible to provide a more effective display of the window.

Furthermore, the apparatus and method described above facilitate the operation performed by the operator.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail with reference to the accompanying drawings.

[First Embodiment]

Figure 1:
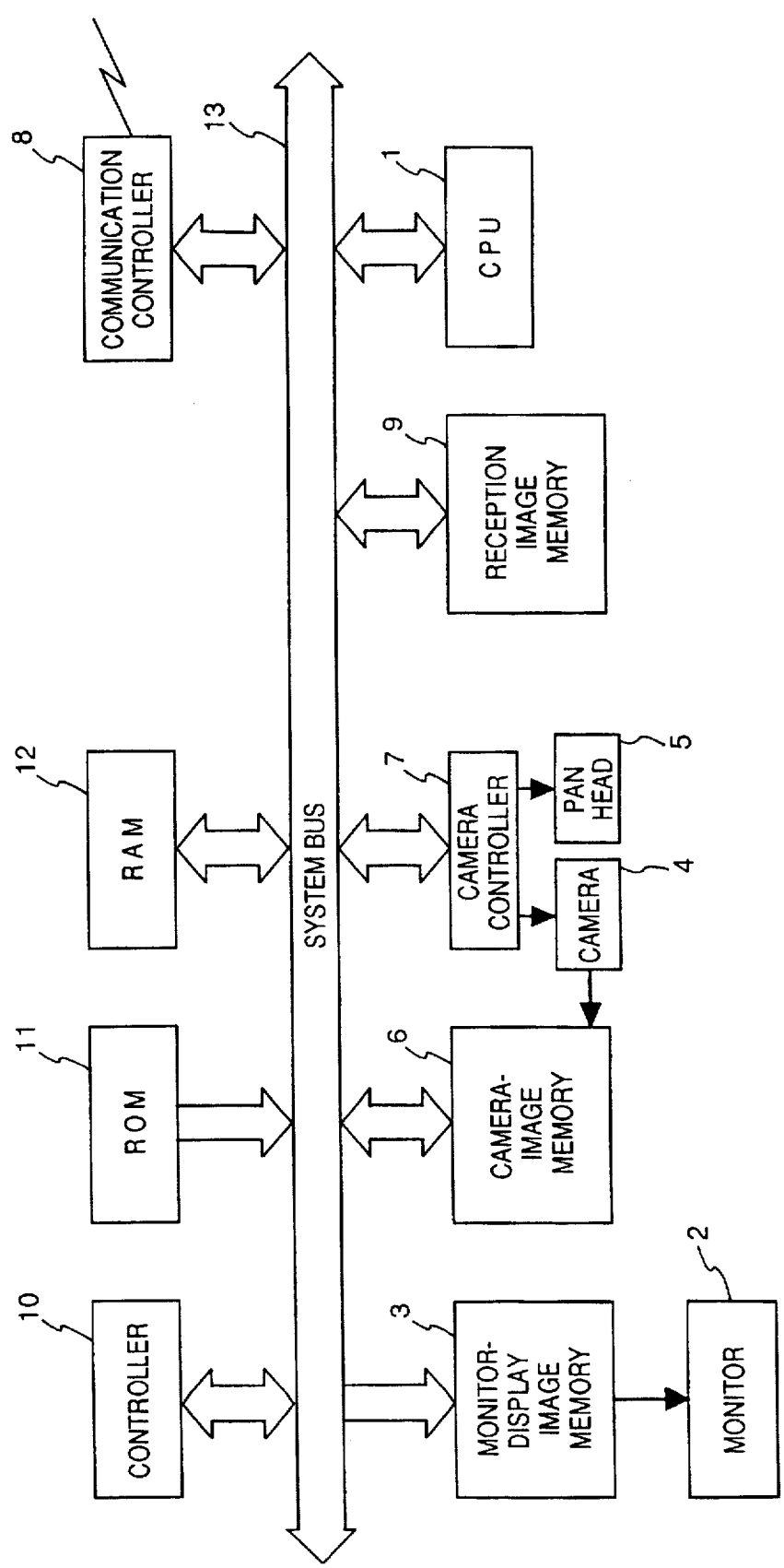
FIG. 1 is a block diagram illustrating the configuration of a still-picture television conference system according to a first embodiment of the present invention.

FIG. 1 is a block diagram illustrating the configuration of a still-picture television conference system (hereinafter referred to simply as the "system") according to a first embodiment of the present invention. As shown in FIG. 1, the system includes a CPU 1 for overall control of the system, a monitor 2 for displaying images stored in an image memory 3 for monitor display, a video camera 4, which is equipped with a zooming mechanism, for picking up the local image of the system operator (namely the operator's own image), a pan head 5 for panning and tilting the video camera 4, and a camera-image memory 6 for storing images from the video camera 4. Images stored in the memory 6 are capable of being read out at any magnification. The system further includes a camera controller 7 for controlling zooming of the video camera 4 as well as panning and tilting of the pan head 5.

The system has a communication controller 8 for controlling communication between the system and a remote location via a line such as an ISDN, LAN, etc., and a reception image memory 9 for storing the image of a party received via the communication controller 8. Images stored in the memory 9 are capable of being read out at any magnification. Also included in the system are a controller 10 constituted by a keyboard, mouse or the like, a ROM 11 for storing the operating program of the CPU 1, and a RAM 12 for temporarily storing data necessary for the operation of the CPU 1. These components are interconnected by a system bus 13.

Figure 2:
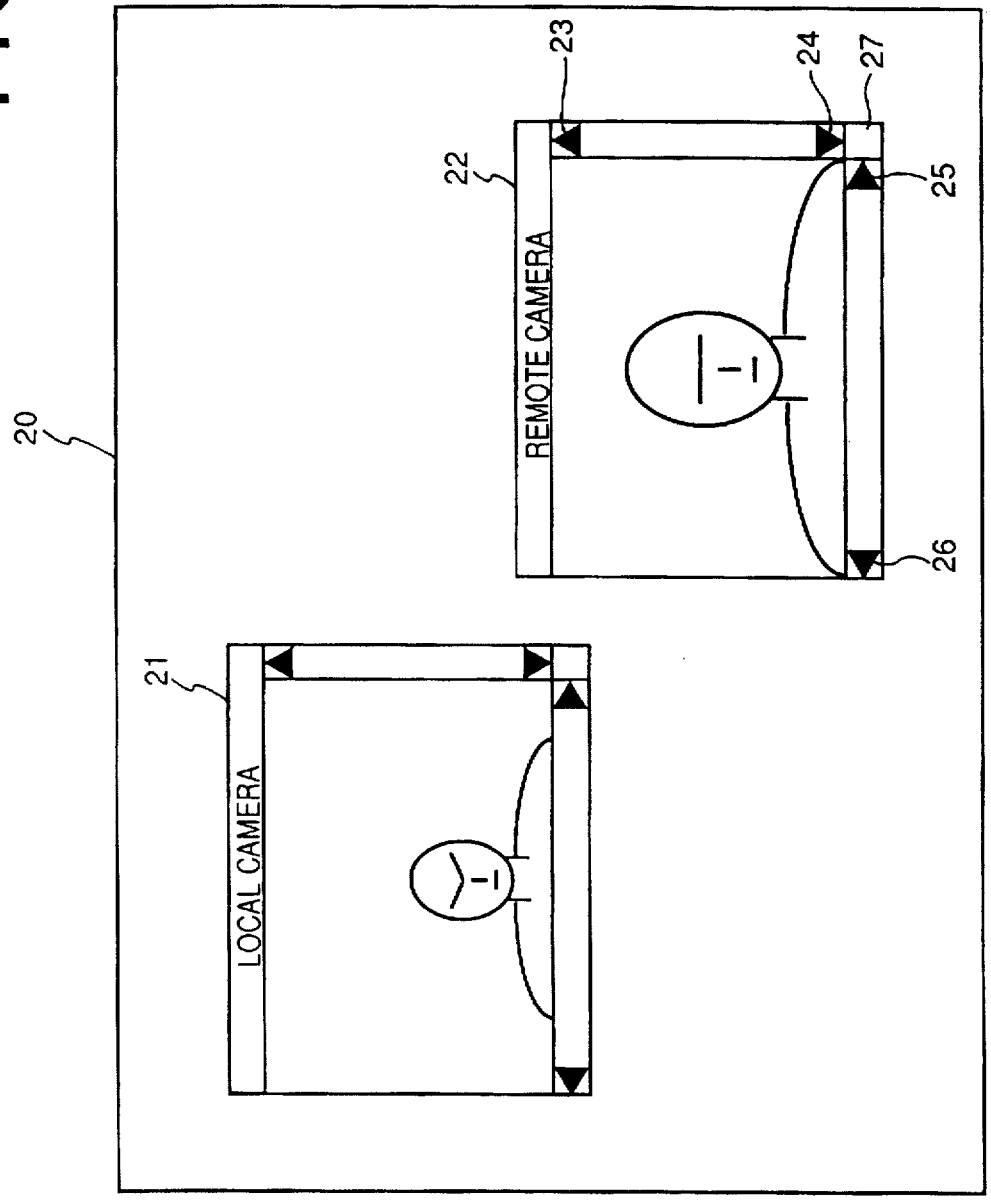
FIG. 2 is a diagram showing an example of a monitor screen in the television conference system according to the first embodiment.

FIG. 2 illustrates an example of the monitor screen in the system of this embodiment. As shown in FIG. 2, a window 21 for displaying a local image and a window 22 for displaying a remote image appear on the monitor screen 20. Each window is manipulated by a scroll-up button 23, a scroll-down button 24, a scroll-right button 25, a scroll-left button 26 and a window enlargement/reduction area 27.

In order to scroll either window, the operator clicks the scroll buttons 23–26 using the mouse constituting the controller 10. To size the window, the operator uses the mouse to drag the window enlargement/reduction area 27. The windows may be manipulated also by a command received from the system of the other party.

The operation of the system according to this embodiment will now be described.

Figure 3:
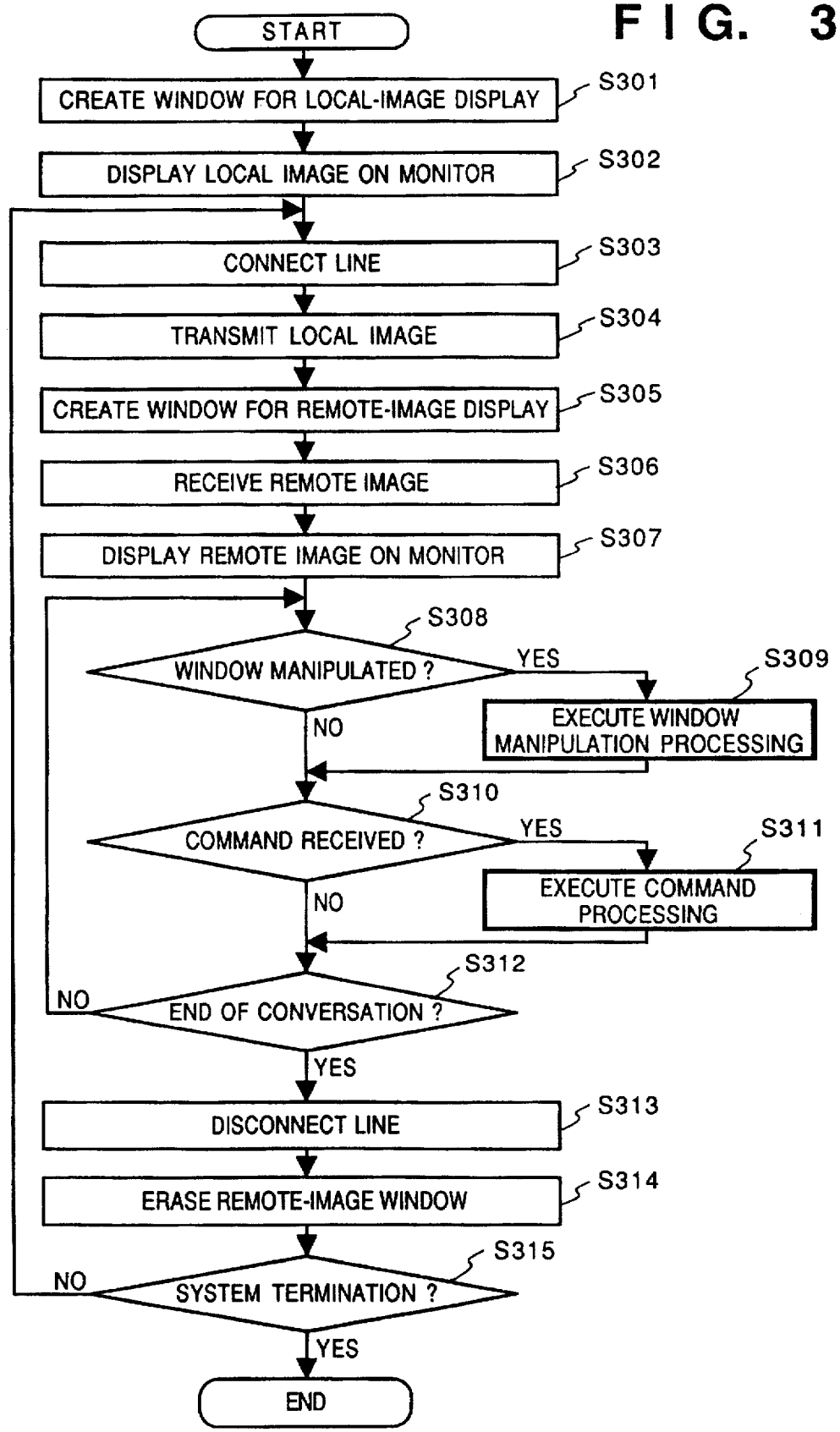
FIG. 3 is a flowchart showing the operation of the system according to the first embodiment.

FIG. 3 is a flowchart showing the operation of the system (television conference system) according to this embodiment. When the system is started, the CPU 1 creates window-image data for the display of the local image at step S301 and transfers this data to the image memory 3 for the monitor display. Next, at step S302, the CPU 1 transfers the data in the camera-image memory 6, which stores the local-image data from the video camera 4, to the monitor-display image memory 3 so as to be displayed in the window 21 for the display of the local image. The local image is displayed on the monitor 2 as a result.

Next, at step S303, the CPU 1 connects the line to the party with which a conversation is desired to be carried out. When the line connection has been achieved, the CPU 1 reads the local-image data out of the camera-image memory 6 and sends this data to the party via the communication controller 8 at step S304. The CPU 1 then creates window-image data for display of the remote image at step S305 and transfers this data to the monitor-display image memory 3. The CPU 1 then requests the image of the other party via the communication controller 8 and waits for reception of image data from the other party.

If image data is received from the other party at step S306, the image data representing the image of the party is transferred to the monitor-display image memory 3 at step S307 in order to display this image in the remote-image display window 22. As a result, the image of the party appears on the monitor 2. The CPU 1 then performs monitoring at step S308 to determine whether a window has been manipulated (e.g., scrolled or enlarged/reduced in size). If it is determined that the window has been manipulated, the CPU 1 executes the corresponding window manipulation processing at step S309.

The CPU 1 monitors also the reception of a camera-control command from the communicating party at step S310. If the command has been received from the party, the CPU 1 executes the corresponding processing at step S311. The processing of steps S308 and S310 is executed until the conversation using this system is found to have ended at step S312. When the conversation ends, the CPU 1 disconnects the line at step S313. The CPU 1 causes the window 22 for the display of the other party's image to vanish at step S314 and then determines whether manipulation of the system has ended at step S315. If end of system manipulation is detected, the window 21 for display of the local image also is caused to vanish and system operation is terminated. If the end of system manipulation is not detected, then the program returns to step S303 and a connection is made to the next party to a conversation.

Figure 4:
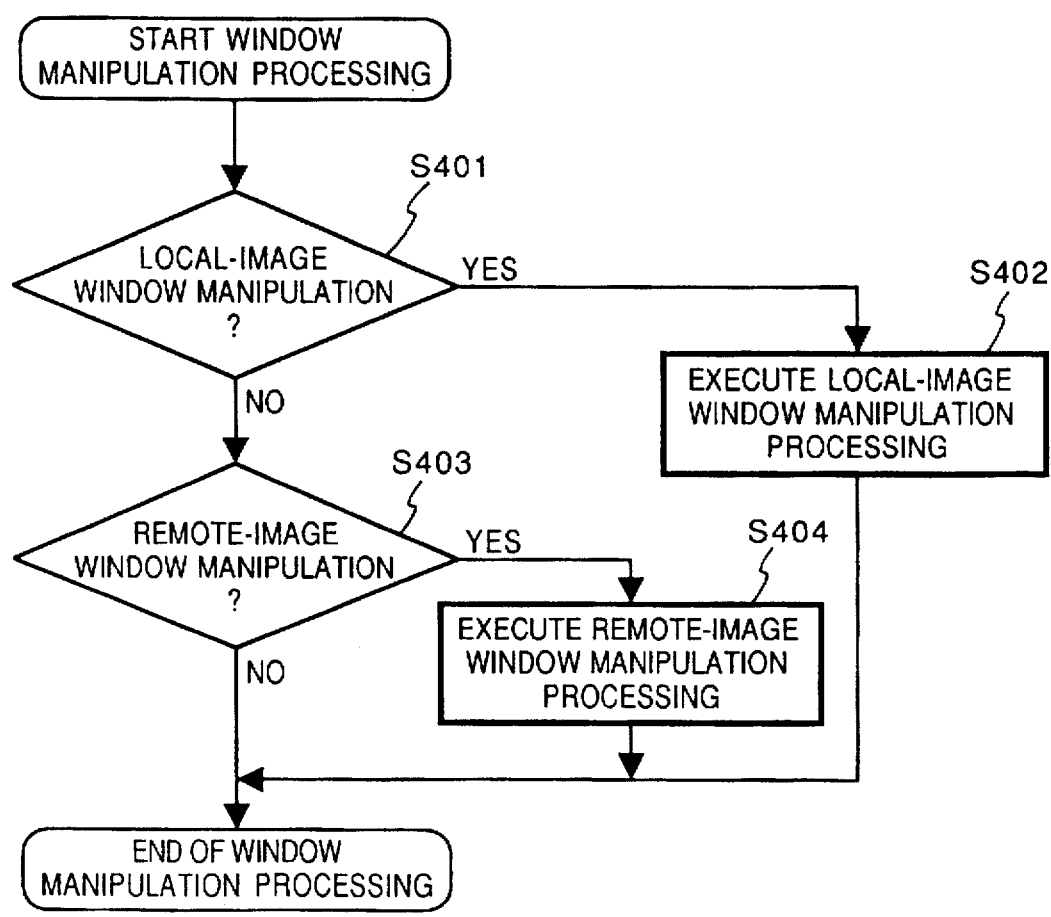
FIG. 4 is a flowchart showing the details of a step S309 in FIG. 3.

FIG. 4 is a flowchart illustrating the details of the operation of window manipulation processing performed at step S309 in FIG. 3.

When a window is manipulated, the CPU 1 determines which one at steps S401 and S403 and executes the corresponding processing. For example, if the manipulated window is the local-image display window 21, the CPU 1 executes window manipulation processing for display of the local image at step S402. If the manipulated window is the remote-image display window 22, on the other hand, the CPU 1 executes window manipulation processing for display of the remote image at step S404.

The operation of step S402, namely the window manipulation processing for the local image, will now be described with reference to the flowchart shown in FIG. 5.

Figure 5:
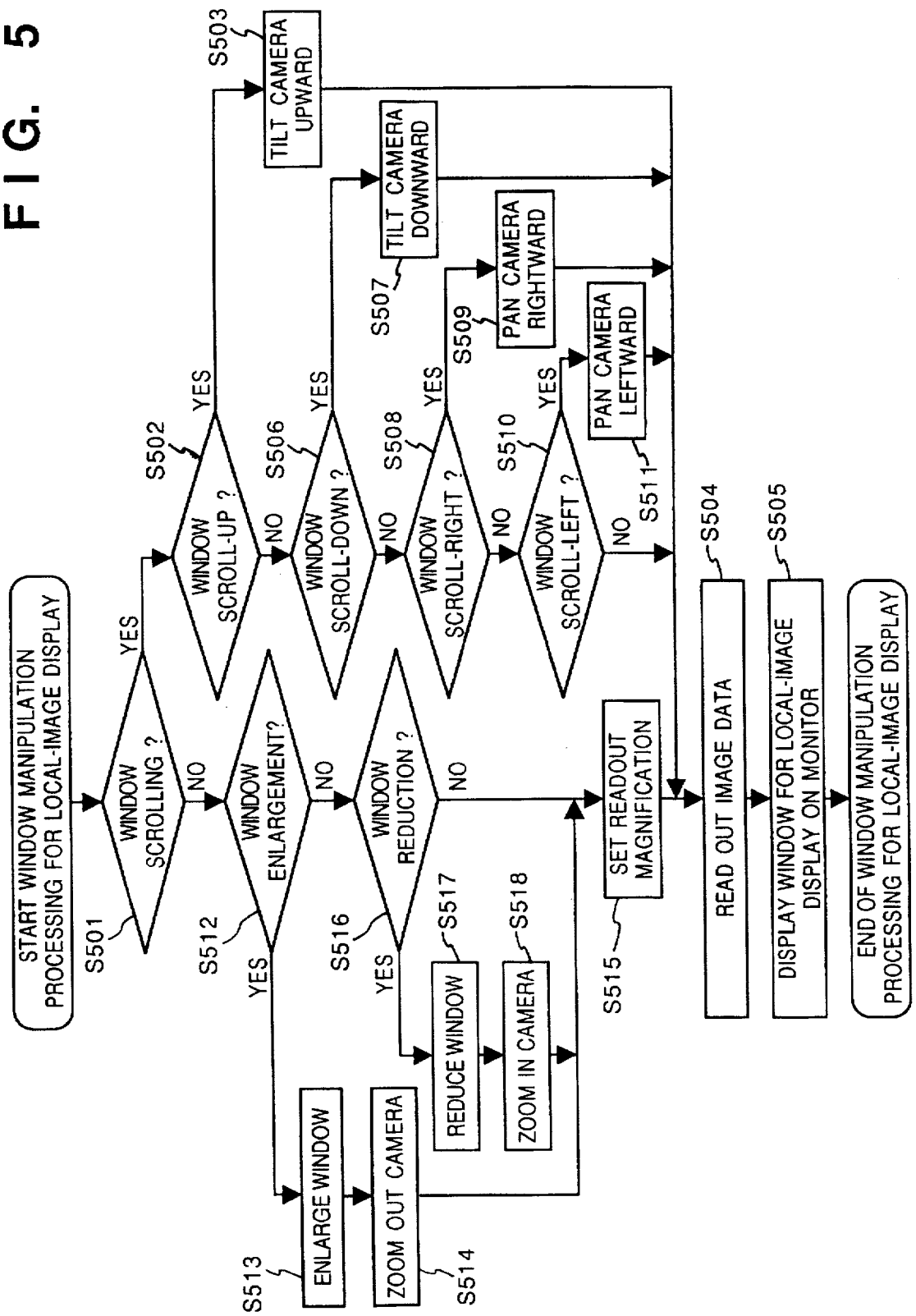
FIG. 5 is a detailed flowchart of local-image window manipulation processing of a step S402 in FIG. 4.

As shown in FIG. 5, the CPU 1 determines at step S501 whether manipulation of the local-image display window 21 is scrolling or not. If the answer is YES, then the camera is tilted or panned, depending upon the scrolling direction. If manipulation of the window is found to be scroll-up at a decision step S502, then the camera controller 7 is instructed to tilt the pan head 5 upward at step S503, thereby moving the camera 4 in the upward direction. When movement of the camera ends, the CPU 1 reads the local-image data out of the camera-image memory 6 at step S504 and transfers this data to the monitor-display image memory 3 at step S305 to display the local image on the monitor 2.

If the scrolling operation is found to be scroll-down at step S506, then the camera controller 7 is instructed to tilt the pan head 5 downward at step S507, thereby moving the camera 4 in the downward direction. If scrolling is instructed to be scroll-right at step S508, the camera controller 7 is instructed to pan the pan head 5 rightward at step S509, thereby moving the camera 4 in the rightward direction. If scrolling is instructed to be scroll-left at step S510, the camera controller 7 is instructed to pan the pan head 5 leftward at step S511, thereby moving the camera 4 in the leftward direction. When movement of the camera ends, steps S504 and S505 are performed to display the data in memory 6 on the monitor 2 in the same manner as executed at the time of the scroll-up operation.

If it is determined at step S512 that the window manipulation is enlargement of the window, the CPU 1 enlarges the local-image display window 21 at step S513 and instructs the camera controller 7 to zoom out the video camera 4, whereby the camera 4 is caused to zoom out. When zoom-out ends, the CPU 1 sets the magnification of readout from the camera-image memory 6 at step S515 so as to agree with the size of the enlarged local-image display window 21.

If the readout magnification has been set, steps S504 and S505 are performed to display the data in memory 6 on the monitor 2 in the same manner as executed at the time of the scroll-up operation.

If it is determined at step S516 that the window manipulation is reduction of the window size, the CPU 1 reduces the size of the local-image display window 21 at step S517 and instructs the camera controller 7 to zoom in the video camera 4, whereby the camera 4 is caused to zoom in. When zoom-in ends, the CPU 1 sets the magnification of readout from the camera-image memory 6 at step S515 so as to agree with the size of the reduced local-image display window 21. After the readout magnification has been set, steps S504 and S505 are performed to display the data in memory 6 on the monitor 2 in the same manner as executed at the time of the scroll-up operation.

The operation of step S404 of FIG. 4, namely the window manipulation processing for the remote image, will now be described with reference to the flowchart shown in FIG. 6.

Figure 6:
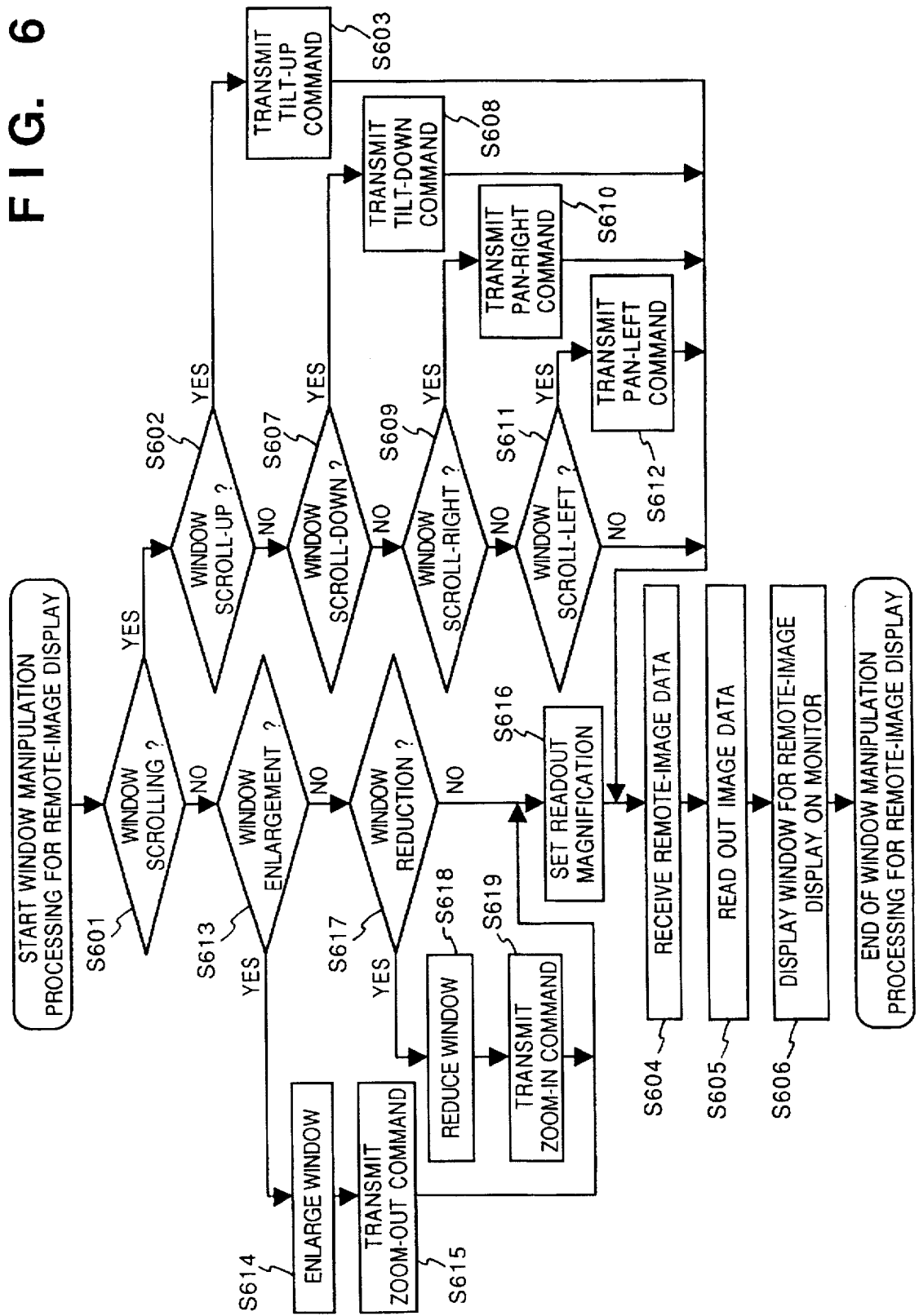
FIG. 6 is a detailed flowchart of remote-image window manipulation processing of a step S404 in FIG. 4.

As shown in FIG. 6, the CPU 1 determines at step S601 whether manipulation of the remote-image display window 22 is scrolling or not. If the answer is YES, then a command is transmitted to the other party to command tilting or panning of the camera on the side of the other party, depending upon the scrolling direction. More specifically, if manipulation of the window is judged to be scroll-up at a step S602, then a command instructing upward tilting of the camera on the other party's side is transmitted via the communication controller 8 at step S603, after which the CPU 1 waits for reception of the image data from the other party. When this image data is received at step S604, the image data of the other party stored in the reception image memory 9 is read out of this memory at step S605 and the data is transferred to the monitor-display image memory 3 at step S606 to display the image of the other party on the monitor 2.

If the scrolling operation is found to be scroll-down at step S607, then a command instructing downward tilting of the camera on the other party's side is transmitted via the communication controller 8 at step S608. If scrolling to the right is judged at step S609, then a command instructing rightward panning of the camera on the other party's side is transmitted via the communication controller 8 at step S610. If scrolling to the left is judged at step S611, then a command instructing leftward panning of the camera on the other party's side is transmitted via the communication controller 8 at step S612, after which the CPU 1 waits for reception of the image data from the other party. When image data representing the other party is received after transmission of these commands, the processing of steps S604-S606 is executed to display the data in memory 9 on the monitor 2 in the same manner as executed at the time of the scroll-up operation.

If it is judged at step S613 that the window manipulation is enlargement of the window, the CPU 1 enlarges the remote-image display window 22 at step S614, transmits a command instructing zoom-out of the camera on the other party's side via the communication controller 8 at step S615 and sets magnification of readout from the reception image memory 9 at step S616 so as to agree with the size of the enlarged remote-image display window 22. After the readout magnification has been set, the processing of steps S604-S606 is performed to receive the image of the other party and display this image on the monitor 2 in the same manner as executed at the time of the scroll-up operation.

If it is judged at step S617 that the window manipulation is reduction of the window size, the CPU 1 reduces the size of the remote-image display window 22 at step S618, transmits a command instructing zoom-in of the camera on the other party's side via the communication controller 8 at step S619 and sets magnification of readout from the reception image memory 9 at step S616 so as to agree with the size of the reduced remote-image display window 22. After the readout magnification has been set, the processing of steps S604-S606 is performed to receive the image of the other party and display this image on the monitor 2 in the same manner as executed at the time of the scroll-up operation.

Figure 7:
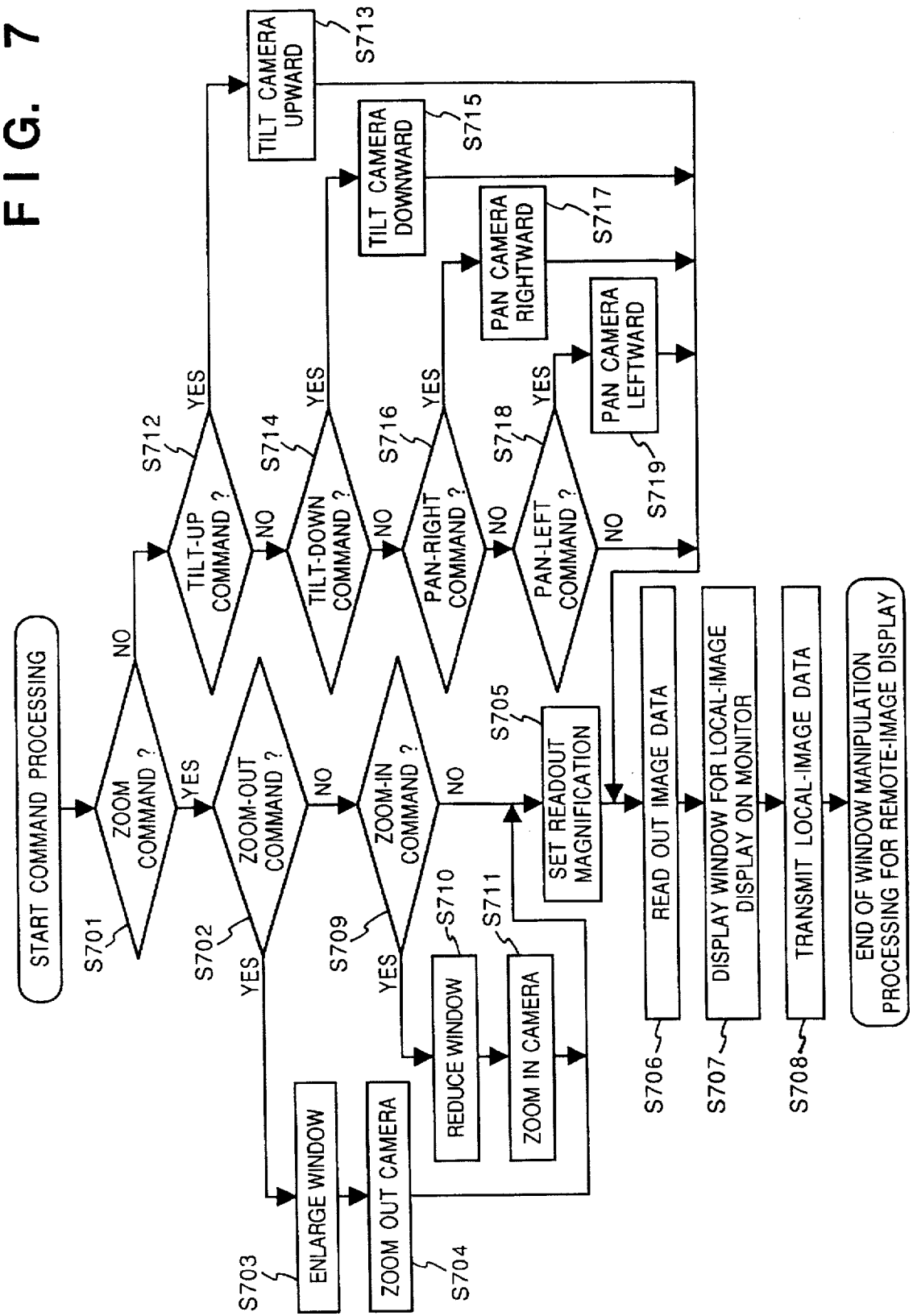
FIG. 7 is a flowchart for describing command processing shown at a step S311 in FIG. 3.
Figure 8:
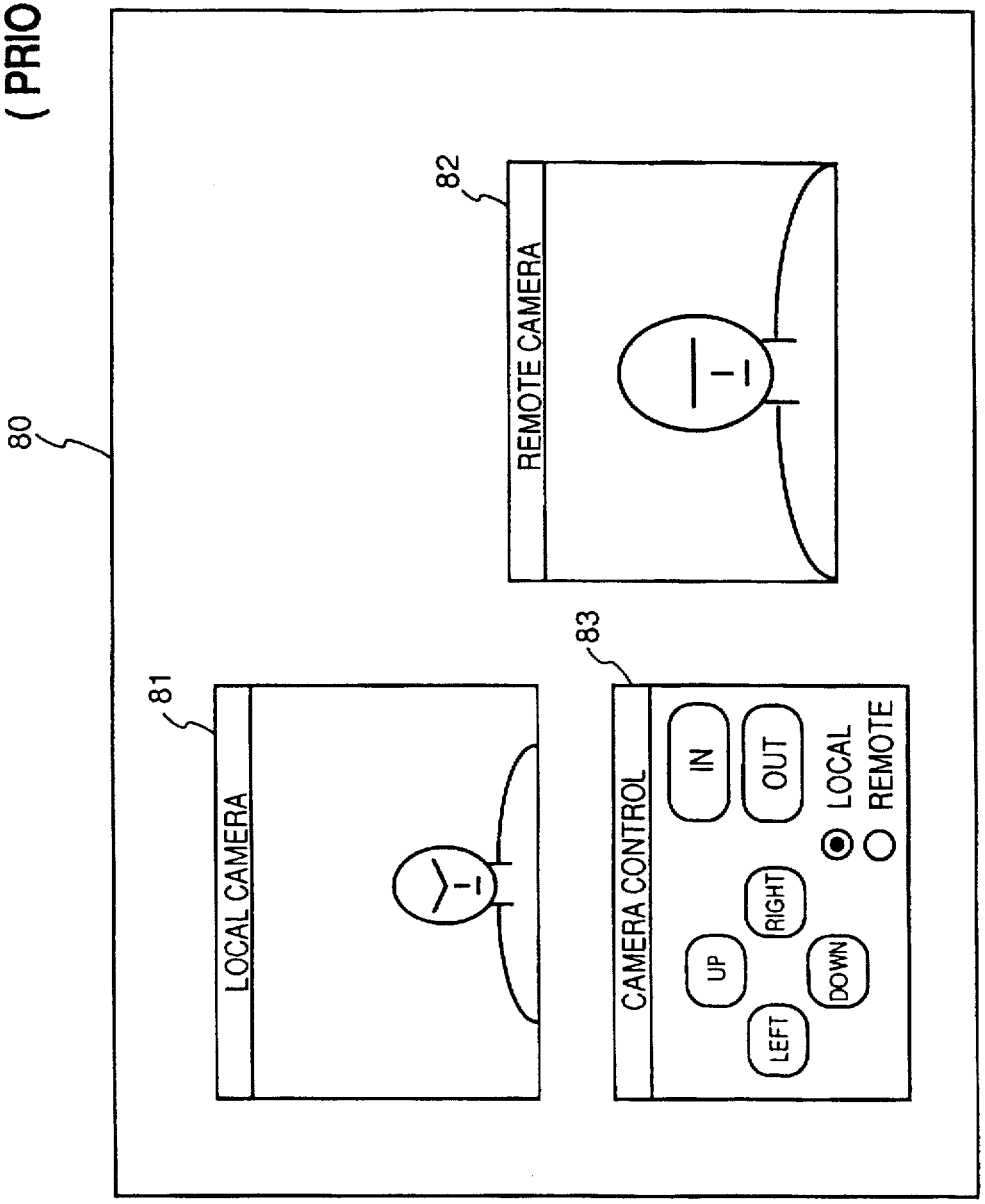
FIG. 8 is a diagram representing a monitor screen in a television conference system according to the prior art.

FIG. 7 is a flowchart for describing the command processing shown at a step S311 in FIG. 3.

As shown in FIG. 7, the CPU 1 determines at step S701 whether a command received from the communicating party is a command designating zoom. Further, the CPU 1 determines whether the command is for zoom-out or zoom-in at steps S702 and S709, respectively. If the command is a zoom-out command, the CPU 1 enlarges the window 21 for display of the local image at step S703 and commands the camera controller 7 to zoom out the video camera 4 at step S704, thereby causing the video camera 4 to zoom out. If zoom-out is concluded, the CPU 1 sets magnification of readout from the camera-image memory 6 at step S705 so as to agree with the size of the enlarged local-image display window.

Next, at step S706, the CPU 1 reads the local-image data out of the camera-image memory 6 and transfers this data to the monitor-display image memory 3 at step S707, whereby this image is displayed on the monitor 2. The CPU 1 then reads the local-image data out of the camera-image memory 6 and transmits this data to the side of the other party via the communication controller 8 at step S708.

If the command received from the other party is a zoom-in command, the CPU 1 reduces the size of the window 21 for display of the local image at step S710 and commands the camera controller 7 to zoom in the video camera 4 at step S711, thereby causing the video camera 4 to zoom in. If zoom-in is concluded, the CPU 1 sets magnification of readout from the camera-image memory 6 at step S705 so as to agree with the size of the reduced local-image display window. When the readout magnification has been set, the processing of steps S706-S708 is performed to transmit the local-image data to the other party in the same manner as executed at the time of the zoom-out operation.

If the command received from the communicating party is found to be a tilt-up command at step S712, the CPU 1 commands the camera controller 7 to tilt the pan head 5 upward, whereby the pan head 5 is tilted in the upward direction. When tilt-up ends, the CPU 1 executes steps S706-S708 to transmit the local-image data to the other party in the same manner as executed at the time of the zoom-out operation. If the command received from the communicating party is found to be a tilt-down command at step S714, the CPU 1 commands the camera controller 7 to tilt the pan head 5 downward, whereby the pan head 5 is tilted in the downward direction. When tilt-down ends, the CPU 1 executes steps S706-S708 to transmit the local-image data to the other party in the same manner as executed at the time of the zoom-out operation.

If the command received from the communicating party is found to be a pan-right command at step S716, the CPU 1 commands the camera controller 7 to pan the video camera 4 to the right, whereby the pan head 5 is panned in the rightward direction. When pan-right ends, the CPU 1 executes steps S706-S708 to transmit the local-image data to the other party in the same manner as executed at the time of the zoom-out operation. If the command received from the communicating party is found to be a pan-left command at step S718, the CPU 1 commands the camera controller 7 to pan the video camera 4 to the left, whereby the pan head 5 is panned in the leftward direction. When pan-left ends, the CPU 1 executes steps S706-S708 to transmit the local-image data to the other party in the same manner as executed at the time of the zoom-out operation.

Thus, in accordance with the television conference system of the embodiment described above, the manipulations for scrolling, enlarging and reducing an image-display window and camera control for panning, tilting and zooming are linked, thereby making actual camera control coincide with the presentation of an image display on a monitor. As a result, the system can be manipulated with ease while the operator observes the monitor screen.

Further, by providing a camera-control window in close proximity to a window for image display, it is possible to prevent the effective display area of the monitor screen from being made too small by camera-control window.

[Second Embodiment]

A second embodiment of the present invention will now be described.

Figure 9:
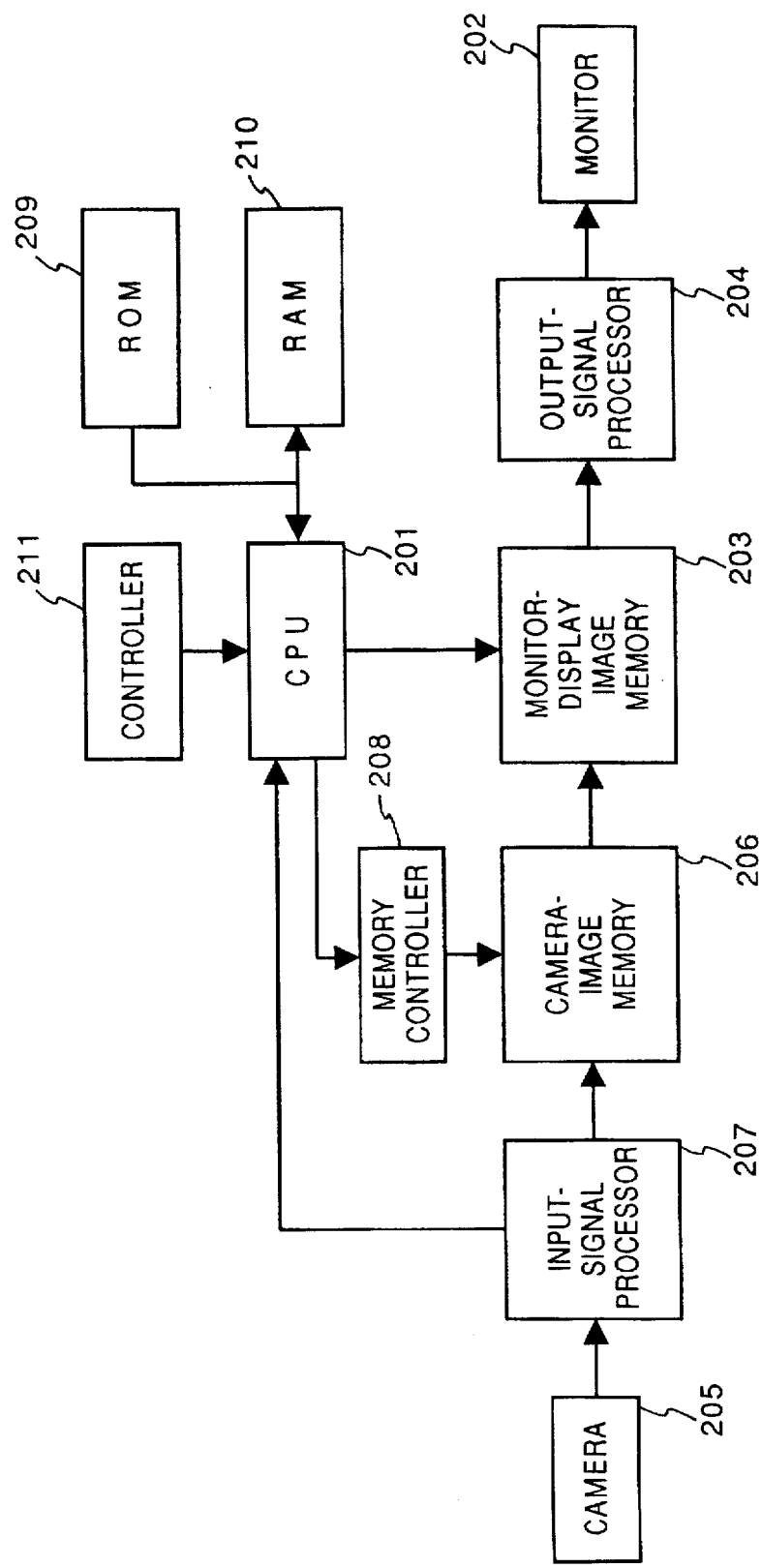
FIG. 9 is a block diagram illustrating the overall configuration of an information processing system according to a second embodiment of the present invention.

FIG. 9 is a block diagram illustrating the overall configuration of an information processing system according to a second embodiment of the present invention. As shown in FIG. 9, a CPU 201 controls the overall system. An output-signal processor 204 outputs the image from a monitor-display image memory 203 to a monitor 202, where the image is displayed. A video camera 205 is a photographic device for entering a photographed image to the system. A camera-image memory 206 stores the image from the video camera 205.

An input-signal processor 207 senses whether there is an input signal from the video camera 205 and stores the image from the video camera 205 in the camera-image memory 206. A memory control circuit 208 reads the data of the camera-image memory 206 out to the monitor-display image memory 203 in any size. A ROM 209 stores the operating program of the CPU 201, etc. A RAM 210 temporarily stores data necessary for the operation of the CPU 201. A controller 211 is constituted by a keyboard, mouse or the like.

Figure 10:
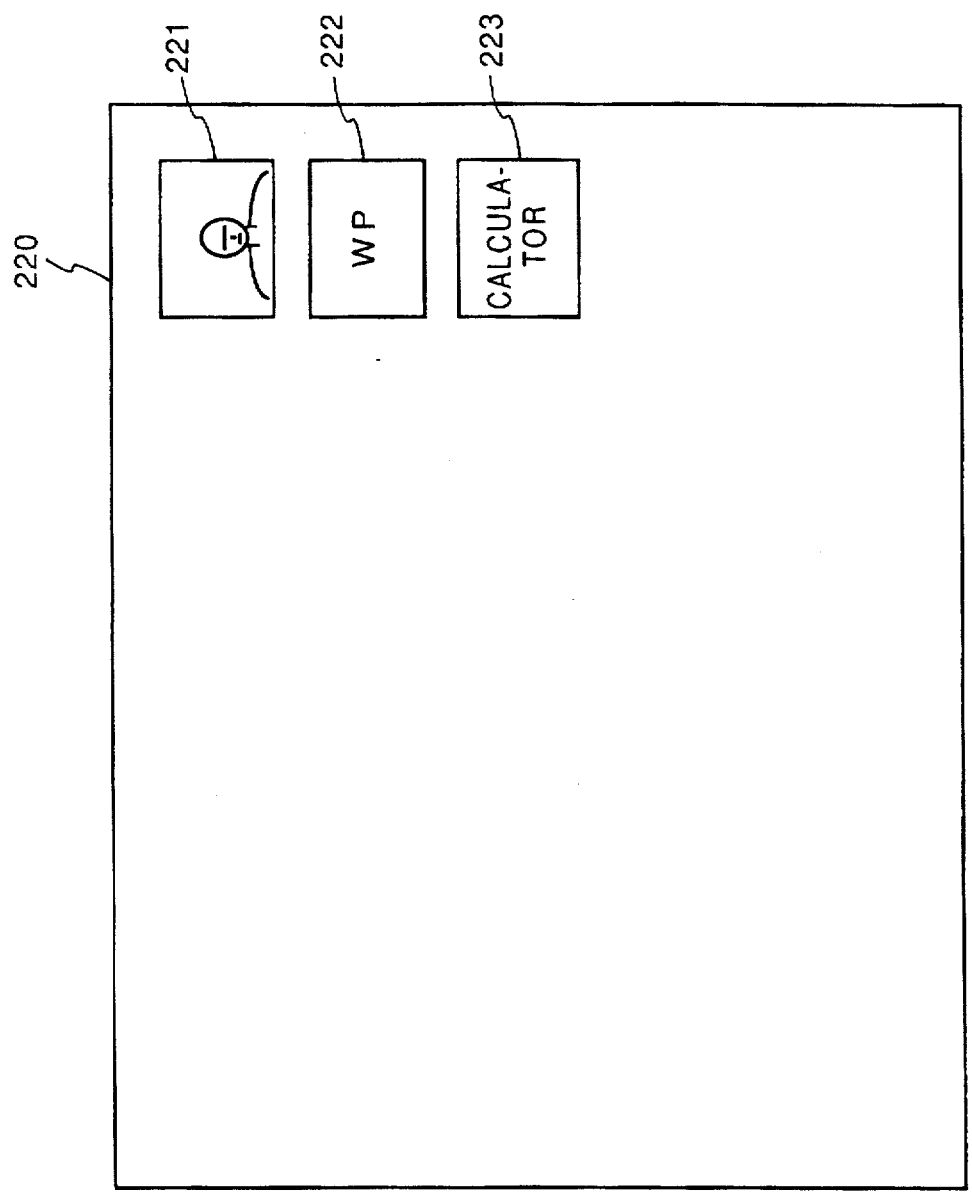
FIG. 10 is a diagram showing an example of a monitor screen in the system according to the second embodiment.

FIG. 10 is a diagram showing an example of a monitor screen in the system according to this embodiment. As shown in FIG. 10, an icon 221 for a TV-telephone application program, an icon 222 for a word-processor application program and an icon 223 for a calculator application program are displayed on a monitor screen 220. In this embodiment, each application is started by clicking its icon using the mouse constituting the controller 211 shown in FIG. 9.

The operation of the system according to this embodiment will now be described.

Figure 11:
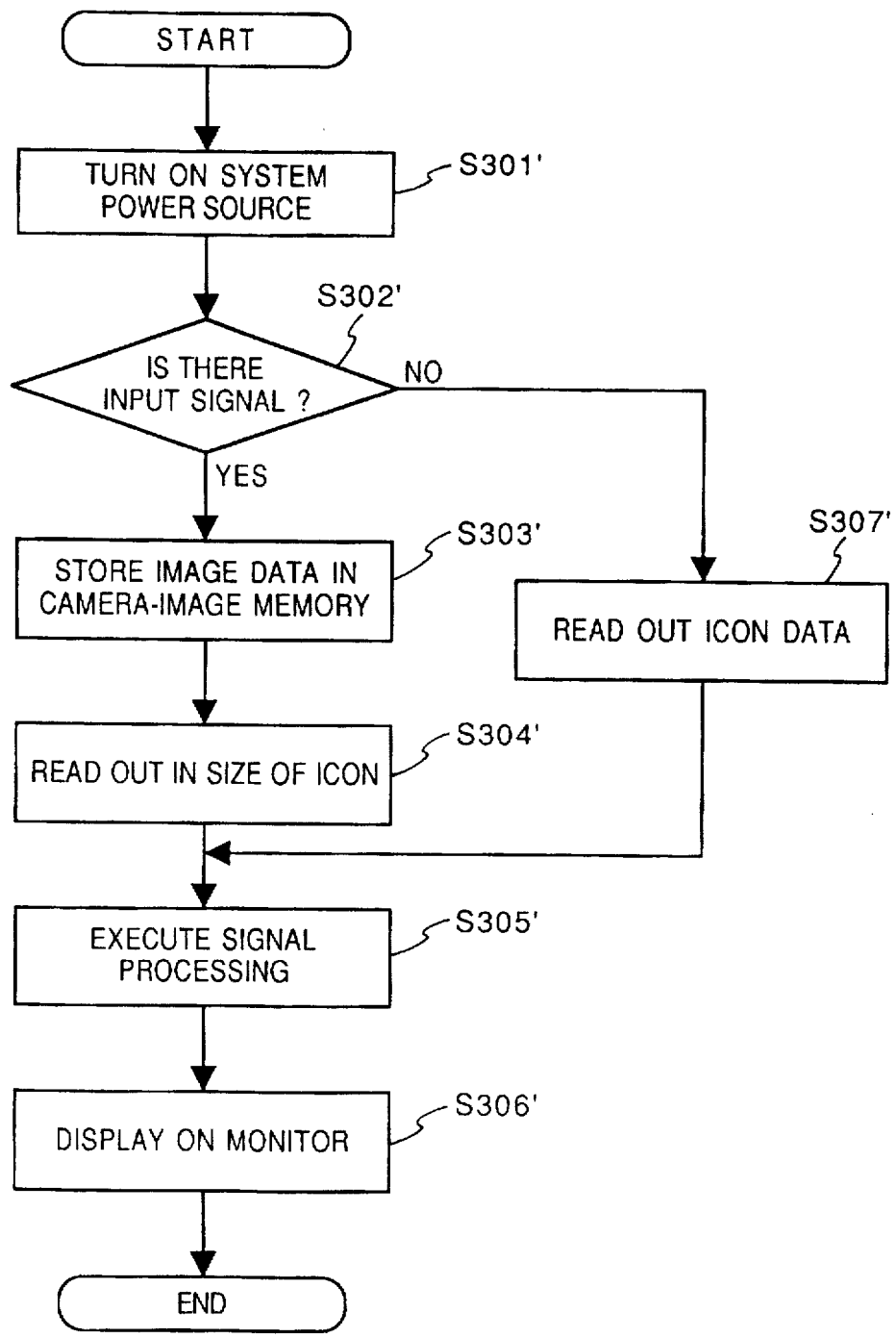
FIG. 11 is a flowchart showing the operation of the system according to the second embodiment.

FIG. 11 is a flowchart illustrating the operation of the system according to this embodiment. When the power supply of the system is turned on at step S301'in the flowchart of FIG. 11, the CPU 201 determines at step S302' whether there is an input signal to the input-signal processor 207 from the video camera 205. If the decision rendered at step S302' is YES, the image from the video camera 205 is stored in the camera-image memory 206 via the input-signal processor 207 at step S303'.

Next, at step S304', the CPU 201 commands that the image data stored at step S303' be read out of the camera-image memory 206 and transferred to the monitor-display image memory 203 as an icon in such a manner that the size of the image will become the size of an icon. When the transfer of the image data has taken place, the output-signal processor 204 executes processing at step S305' for outputting this image data to the monitor 202. This image is displayed on the monitor 202 at step S306.

If it is found at step S302' that there is no input signal from the video camera 205 after the power supply of the camera 205 has been turned on, then the CPU 201 reads already stored icon data out of the RAM 210 at step S307' and transfers this data to the monitor-display image memory 203 as an icon. This is followed by steps S305' and S306', at which CPU executes processing identical with that performed when there was an input signal from the video camera 205.

Thus, in this embodiment as described above, input video is displayed in the form of an icon for a TV conversation application in an information processing system capable of running a plurality of applications. As a result, the icon display of a TV-telephone application program is made easier to understand.

In a case where there is no image input to the information processing system, an icon prepared in advance is displayed. This makes it possible for the operator to verify whether there is an input image merely by observing the icon display without starting the program.

In the embodiment described above, an arrangement may be adopted in which it is constantly sensed whether there is an input signal from the video camera 205, image data is read out of the camera-image memory 206 at fixed time intervals, the image data is transferred to the monitor-display image memory 203 and the icon data for the TV-telephone application is displayed upon being rewritten.

[Third Embodiment]

A third embodiment of the present invention will now be described.

Figure 12:
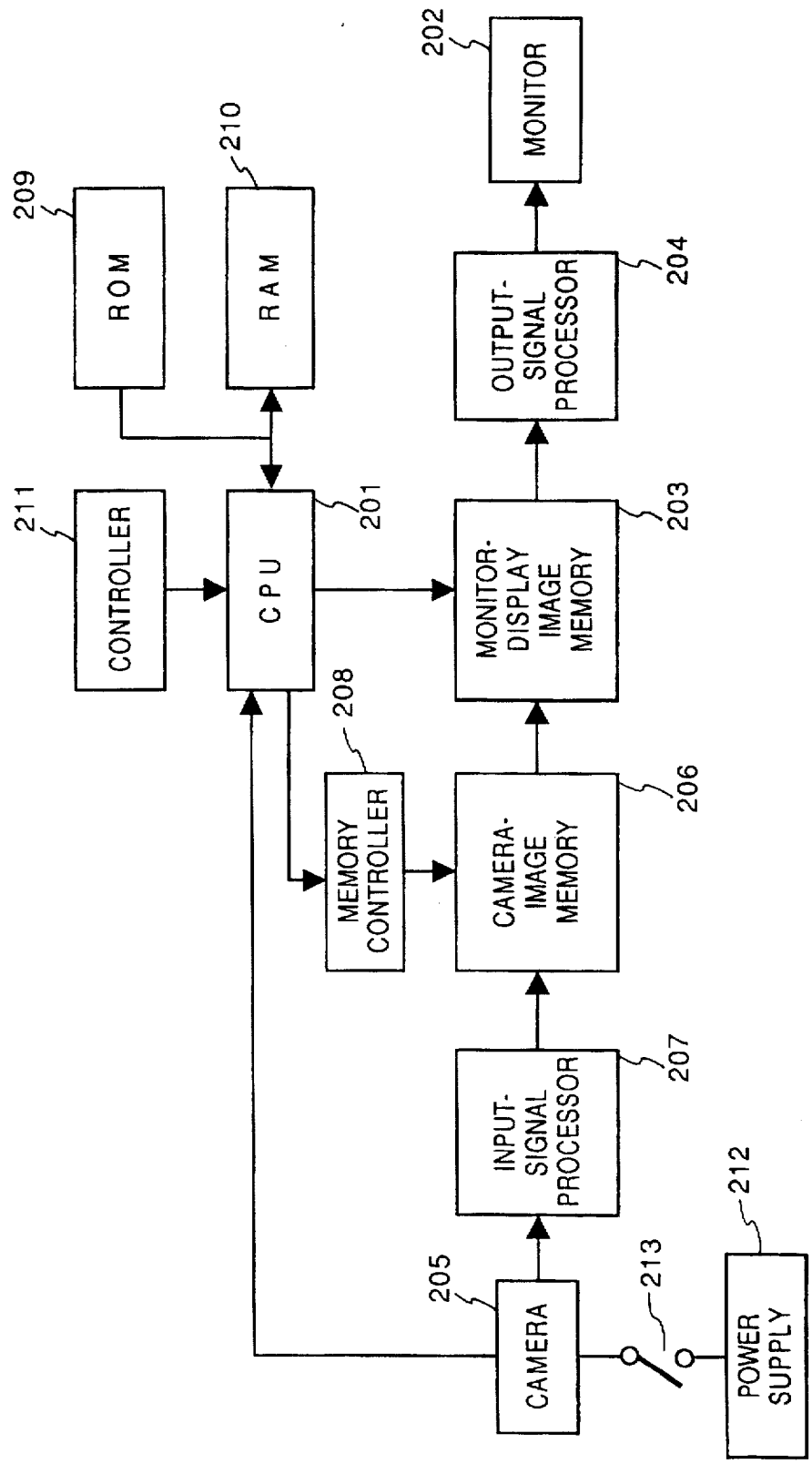
FIG. 12 is a block diagram illustrating a third embodiment of the present invention.

FIG. 12 is a block diagram illustrating the configuration of an information processing system equipped with a TV telephone according to a third embodiment of the present invention. As shown in FIG. 12, the CPU 201 controls the overall system. The output-signal processor 204 outputs the image from the monitor-display image memory 203 to the monitor 202, where the image is displayed. The video camera 205 is a photographic device for entering a photographed image to the system. The camera-image memory 206 stores the image from the video camera 205.

The input-signal processor 207 senses whether there is an input signal from the video camera 205 and stores the image from the video camera 205 in the camera-image memory 206. The memory control circuit 208 reads the data of the camera-image memory 206 out to the monitor-display image memory 203 in any size. The ROM 209 stores the operating program of the CPU 201, etc. The RAM 210 temporarily stores data necessary for the operation of the CPU 201. The controller 211 is constituted by a keyboard, mouse or the like. A power supply 212 supplies the video camera 205 with power. A switch 213 is for delivering the supplied power to the video camera 205.

Figure 14:
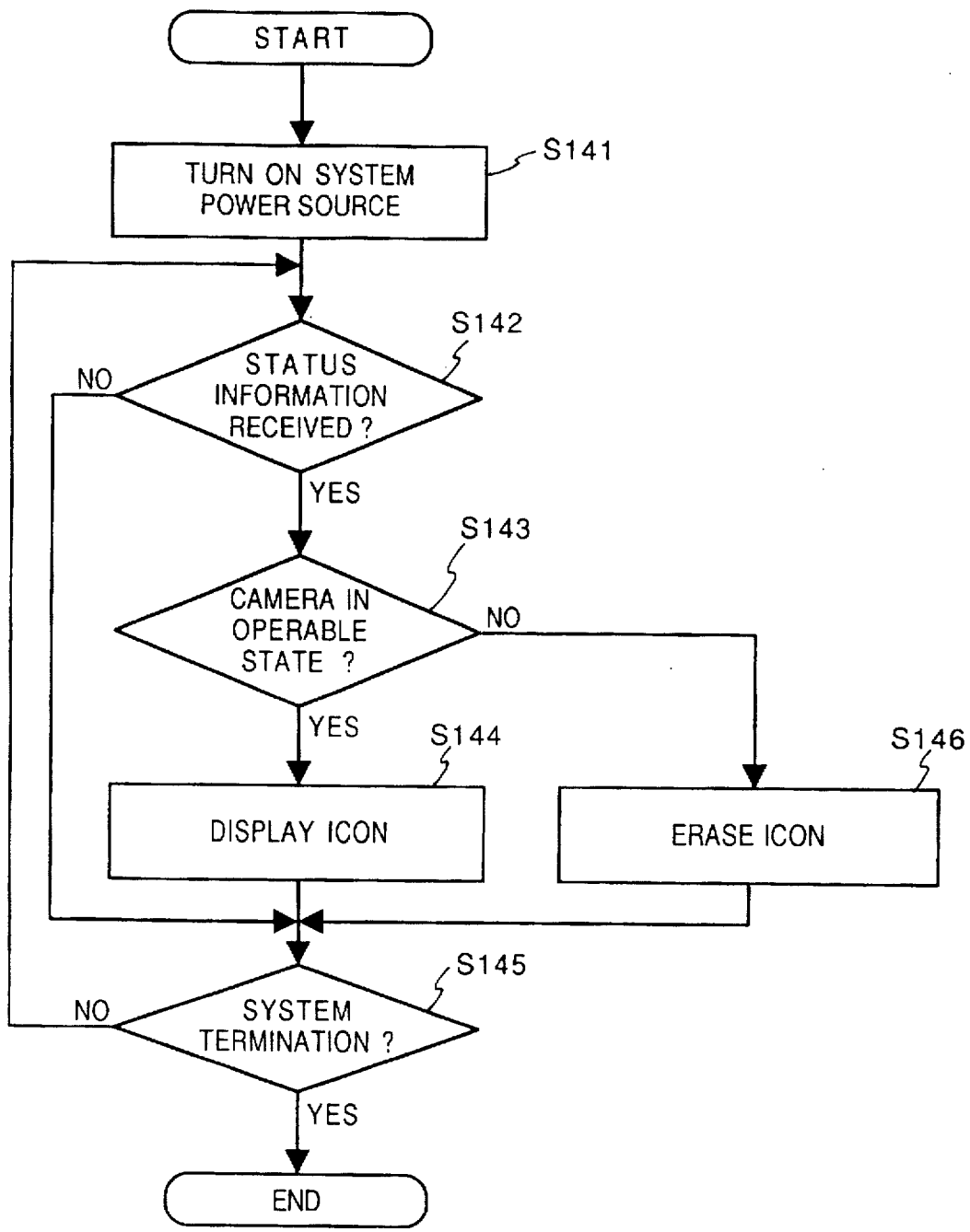
FIG. 14 is a flowchart showing the operation of the third embodiment of the invention.

The operation of the system according to this embodiment will now be described with reference to the flowchart of FIG. 14. The power source of the information processing system is turned on at step S141. This is followed by step S142, at which the CPU 201 waits for reception of information from the video camera 205 indicating the operating status of the video camera. When the power supplying switch 213 is closed to supply the video camera 205 with power from the power supply 21, an initial setting operation is performed and the information indicating the operating status of the camera is transmitted to the CPU 201. Next, if the information indicative of the operating status is received from the video camera 205 at step S142, the status of the camera 205 is checked at step S143 based upon the received information. If the camera is found to be in an operable state, already stored icon data for a TV-conference application program is read out of the RAM 210 by the CPU 201 at step S144, and the CPU 201 transfers this data to the monitor-display image memory 203 as the image of the icon for the TV-conference application program. This image is displayed on the monitor 202. Thereafter, termination of the system is awaited at step S145. Processing is ended at system termination. If the system does not terminate, processing is repeated from step S142.

If it is found at step S143 that the camera is not in an operable state, then the CPU 201 transfers data for erasing the icon data for the TV-conference application program to the monitor-display image memory 203 at step S146, whereby the icon for the TV conference is caused to vanish from the monitor 202.

Step S145 is executed if the information indicating the operating status of the video camera 205 is not received from the video camera at step S142.

It should be noted that the CPU 201 may execute steps S142–S146 while a variety of processing is being performed by the system of this embodiment. Further, an appropriate time may be measured by a timer (not shown) and the CPU 201 may execute steps S142–S146 at this time interval.

Figure 13:
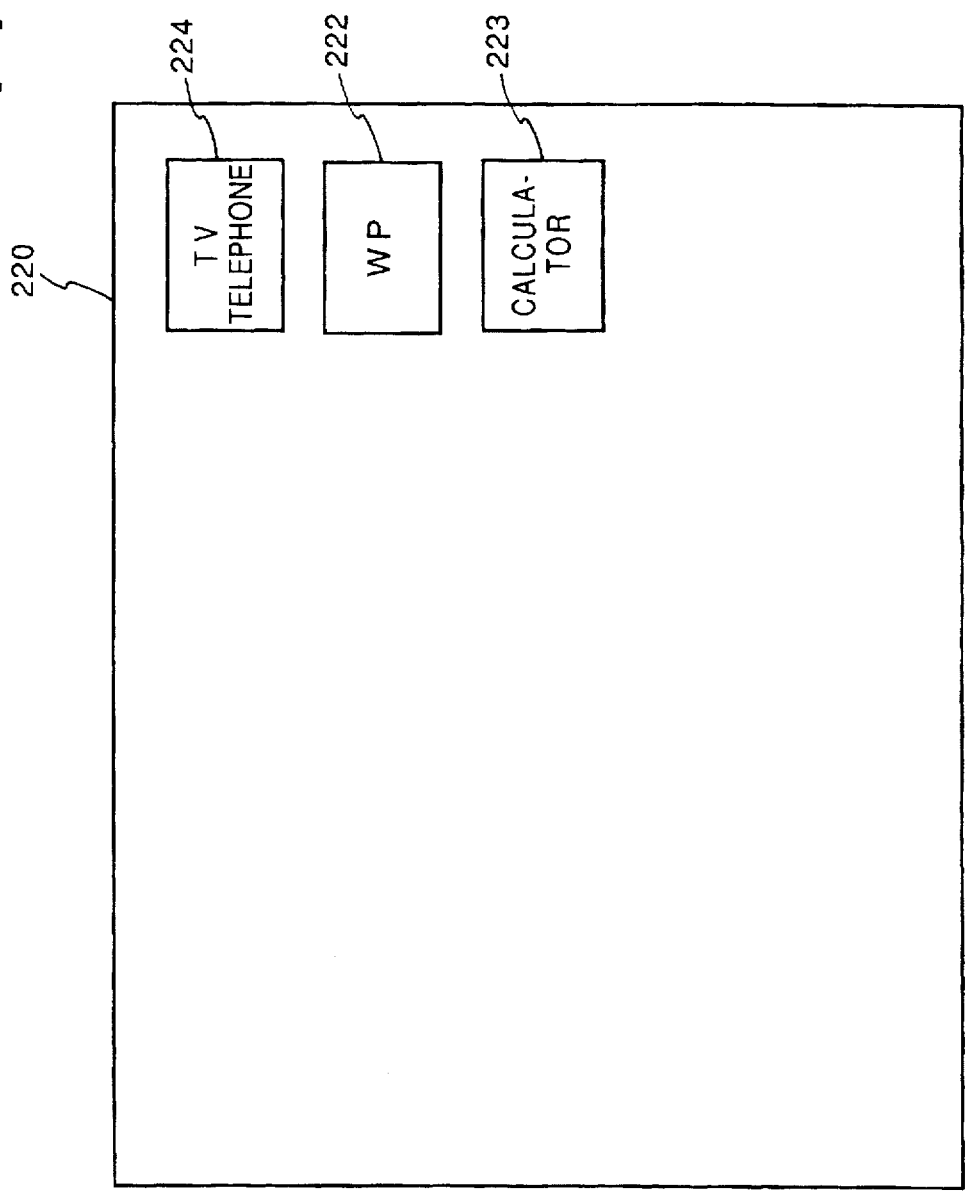
FIG. 13 is a diagram showing a monitor screen according to the third embodiment of the invention.

FIG. 13 is a diagram showing the screen of the monitor 202 according to this embodiment. An icon 224 for a TV-telephone application program, the icon 222 for a word-processor application program and the icon 223 for a calculator application program are displayed on a monitor screen 220. Each application is started by clicking its icon using the mouse constituting the controller 211.

Thus, in accordance with this embodiment as described above, status notification means for notifying of the status of an image sensing device is provided in an information processing system capable of running a plurality of application programs inclusive of a TV-telephone application program that employs the image sensing device. When the status notification means has given notification of the fact that the image sensing device is in an operable state, the icon for the TV-telephone application is displayed. When notification is given of the fact that the image sensing device is not in an operable state, the icon for the TV-telephone application is caused to vanish. Thus, the operator is capable of verifying the status of the image sensing device by observing the icon of the TV-telephone application, and the operator can start the TV-telephone application upon confirming that the sensing device is operable. This makes it easier for the operator to operate the system.

The states of the image sensing device include a state in which its power supply has not been turned on, as well as a state in which an output of a correct level is not obtained even though the power supply has been turned on.

In the embodiment described above, the arrangement is such that the icon for the TV telephone is not displayed if the video camera 205 is not being supplied with power. However, it may be arranged so that the icon is displayed even in such case. Specifically, an arrangement may be adopted in which the operating state of the television camera is detected when the TV-telephone application has been selected, and a display indicating an abnormality is presented if the operating state is abnormal.

The present invention can be applied to a system constituted by a plurality of devices or to an apparatus comprising a single device. Furthermore, it goes without saying that the invention is applicable also to a case where the object of the invention is attained by supplying a program to a system or apparatus.

The video camera in this embodiments is shown as an example of image pick up means.

As many apparently widely different embodiments of the present invention can be made without departing from the spirit and scope thereof, it is to be understood that the invention is not limited to the specific embodiments thereof except as defined in the appended claims.

What is claimed is:

1. A display controlling apparatus for displaying an output image, which is obtained from image pick up means, on a monitor screen, said apparatus comprising:

discriminating means for discriminating whether or not said image pick up means operates; and display control means for controlling a display of an icon corresponding to application software for said image pick up means on the monitor screen wherein the icon is formed on the basis of the output image from said image pick up means when said discrimination means discriminates that said image pick up means operates.

2. A display controlling method for displaying an output image, which is obtained from an image input device, on a monitor screen, said method comprising the steps of:

a discriminating step of discriminating whether or not the image input device operates; and a display controlling step of controlling a display of an icon corresponding to application software for the image input device on the monitor screen, wherein the icon is formed on the basis of the output image from the image input device when the image input device is discriminated as being in operation.

3. The display controlling apparatus according to claim 1, further comprising means for executing the application upon clicking the icon.

4. The display controlling apparatus according to claim 1, further comprising means for deleting the icon in a case where said discriminating means discriminates that said image pick up means does not operate.

5. The display controlling apparatus according to claim 1, further comprising means for updating the icon at a predetermined time period.

6. The display controlling apparatus according to claim 1, wherein the icon is formed by performing a reduction process on the output image from said image pick up means.

7. The display controlling method according to claim 2, wherein the icon displayed at said display controlling step is formed by processing the output image from the image input device.

8. The display controlling method according to claim 2, wherein the application is executed by clicking the icon.

9. The display controlling method according to claim 2, wherein the icon is deleted in a case where said image input device is discriminated at said discriminating step as being not in operation.

10. The display controlling method according to claim 2, wherein the icon is updated at a predetermined time period.

11. The display controlling method according to claim 7, wherein a process which is performed on the output image is reduction.

* * * * *

UNITED STATES PATENT AND TRADEMARK OFFICE
CERTIFICATE OF CORRECTION

PATENT NO.   : 5,757,418                         Page 1 of 2
DATED        : May 26, 1998
INVENTOR(S)  : ATSUSHI INAGAKI It is certified that error appears in the above-identified patent and that said Letters Patent is hereby corrected as shown below:

Column 1

Line 8, "Invention:" should read --Invention--; and
   Line 12, "Art:" should read --Art--.

Column 2

Line 57, "is" should be deleted.

Column 9

Line 33, "S301'in" should read --S301' in--.

Column 11

Line 36, "TV telephone" should read --TV-telephone--;
   Line 39, "such" should read --such a--; and
   Line 52, "pick up" should read --pickup--.

UNITED STATES PATENT AND TRADEMARK OFFICE
CERTIFICATE OF CORRECTION

PATENT NO. : 5,757,418
DATED : May 26, 1998
INVENTOR(S) : ATSUSHI INAGAKI

It is certified that error appears in the above-identified patent and that said Letters Patent is hereby corrected as shown below:

<u>Column 12</u>

```
Line 3,  "pick up" should read --pickup--;
Line 6,  "pick up" should read --pickup--;
Line 10, "pick up" should read --pickup--;
Line 12, "pick up" should read --pickup--;
Line 14, "pick up" should read --pickup--;
Line 34, "pick up" should read --pickup--;
Line 40, "pick up" should read --pickup--; and
Line 55, "reduction" should read --reduction process--.
```

Signed and Sealed this

Ninth Day of March, 1999

Attest:

Q. TODD DICKINSON

*Attesting Officer*  *Acting Commissioner of Patents and Trademarks*